United States Patent
Lin et al.

(10) Patent No.: US 10,528,842 B2
(45) Date of Patent: Jan. 7, 2020

(54) IMAGE PROCESSING METHOD AND IMAGE PROCESSING SYSTEM

(71) Applicant: MEDIATEK INC., Hsin-Chu (TW)

(72) Inventors: Jian-Liang Lin, Yilan County (TW); Yu-Wen Huang, Taipei (TW)

(73) Assignee: MEDIATEK INC., Hsin-Chu (TW)

(*) Notice: Subject to any disclaimer, the term of this patent is extended or adjusted under 35 U.S.C. 154(b) by 404 days.

(21) Appl. No.: 15/424,899

(22) Filed: Feb. 6, 2017

(65) Prior Publication Data
US 2018/0225545 A1 Aug. 9, 2018

(51) Int. Cl.
| G06K 9/46 | (2006.01) |
| G06K 9/62 | (2006.01) |
| G06K 9/00 | (2006.01) |
| G06T 5/20 | (2006.01) |
| G06T 5/00 | (2006.01) |

(52) U.S. Cl.
CPC ....... *G06K 9/4661* (2013.01); *G06K 9/00664* (2013.01); *G06K 9/4642* (2013.01); *G06K 9/6267* (2013.01); *G06K 9/6298* (2013.01); *G06T 5/002* (2013.01); *G06T 5/20* (2013.01); *G06T 2207/20192* (2013.01)

(58) Field of Classification Search
CPC .. G06K 9/0064; G06K 9/4642; G06K 9/4661; G06K 9/6267; G06K 9/6298; G06T 5/002; G06T 5/20; G06T 2207/20192
See application file for complete search history.

(56) References Cited

U.S. PATENT DOCUMENTS

| 9,129,399 B2* | 9/2015 | Jin | G06T 7/248 |
| 2013/0241810 A1* | 9/2013 | Higashi | G09G 3/3406 |
| | | | 345/77 |
| 2014/0055595 A1* | 2/2014 | Kimura | H04N 7/18 |
| | | | 348/80 |
| 2015/0324662 A1* | 11/2015 | Garg | G06K 9/4661 |
| | | | 382/165 |
| 2016/0196637 A1* | 7/2016 | Nguyen | G06T 5/003 |
| | | | 348/224.1 |
| 2017/0178297 A1* | 6/2017 | Fattal | G06T 5/003 |
| 2017/0353680 A1* | 12/2017 | Fukuda | H01L 27/14643 |
| 2018/0122051 A1* | 5/2018 | Li | G06T 5/40 |

(Continued)

FOREIGN PATENT DOCUMENTS

CN 103226816 A 7/2013

OTHER PUBLICATIONS

He et al., "Guided Image Filtering", Oct. 2, 2012.
(Continued)

*Primary Examiner* — Edward Park
(74) *Attorney, Agent, or Firm* — Winston Hsu (57) ABSTRACT

An image processing method applied to an image processing system. The image processing method comprises: (a) computing an image intensity distribution of an input image; (b) performing atmospheric light estimation to the input image; (c) performing transmission estimation according to a result of the step (a) to the input image, to generate a transmission estimation parameter; and (d) recovering scene radiance of the input image according to a result generated by the step (b) and the transmission estimation parameter. At least one of the steps (a)-(c) are performed to data corresponding to only partial pixels of the input image.

20 Claims, 10 Drawing Sheets

(56) References Cited

U.S. PATENT DOCUMENTS

2018/0225545 A1\* 8/2018 Lin .................... G06K 9/4661
2018/0225808 A1\* 8/2018 Chakraborty .......... B60K 35/00

OTHER PUBLICATIONS

He et al., "Single Image Haze Removal Using Dark Channel Prior", 2011.
"What is Guided Image Filtering?", MATLAB and Simulink, 2017.

\* cited by examiner

IMAGE PROCESSING METHOD AND IMAGE PROCESSING SYSTEM

BACKGROUND

Images are usually degraded by turbid medium such as particles or tiny water droplets in the atmosphere, especially in an outdoor scene. Haze, fog and smoke are such phenomena due to atmospheric absorption and scattering. In such scene, the image may lose a color contrast or a color fidelity, thus the image may lose image details and has a poor image quality.

Therefore, image de-hazing methods are developed to solve such problems. However, the conventional image de-hazing method always needs high data computation amount, thus a processing time thereof is always long.

SUMMARY

Therefore, one objective of the present application is to provide an image processing method and an image processing system which can remove haze with fewer data computation amount.

Another objective of the present application is to provide an image processing method and an image processing system which can remove the haze more efficiently.

One embodiment of the present application provides an image processing method applied to an image processing system. The image processing method comprises: (a) computing an image intensity distribution of an input image; (b) performing atmospheric light estimation to the input image; (c) performing transmission estimation according to a result of the step (a) to the input image, to generate a transmission estimation parameter; and (d) performing scene radiance to the input image according to a result generated by the step (b) and the transmission estimation parameter. At least one of the steps (a)-(c) are performed to data corresponding to only partial pixels of the input image.

Another embodiment of the present application provides an image processing system an image processing system comprising an image intensity computing module, an atmospheric light estimation module a transmission estimation module a scene radiance recovering module.

The image intensity computing module computes an image intensity distribution of an input image. The atmospheric light estimation module performs atmospheric light estimation to the input image. The transmission estimation module performs transmission estimation according to a result of the image intensity computing module to the input image, to generate a transmission estimation parameter. The scene radiance recovering module performs scene radiance to the input image according to a result generated by the step atmospheric light estimation module and the transmission estimation parameter. At least one of the image intensity computing module, the atmospheric light estimation module and the transmission estimation module performs corresponding operations to data corresponding to only partial pixels of the input image.

In view of above-mentioned embodiments, the haze in the image can be removed based on fewer data computation amount. Also, the image can be classified into different regions, such that the steps for removing haze can be more effective.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided for explaining the concept of the present invention. It will be appreciated that the apparatus, the system or the module illustrated in following descriptions can be implemented by hardware (ex: a circuit), or hardware with software (ex: a processor with a program). Further, at least one program can be recorded in a computer readable recording medium such as a hard disk or a memory, and the following methods can be performed if the program is executed.

Figure 1:
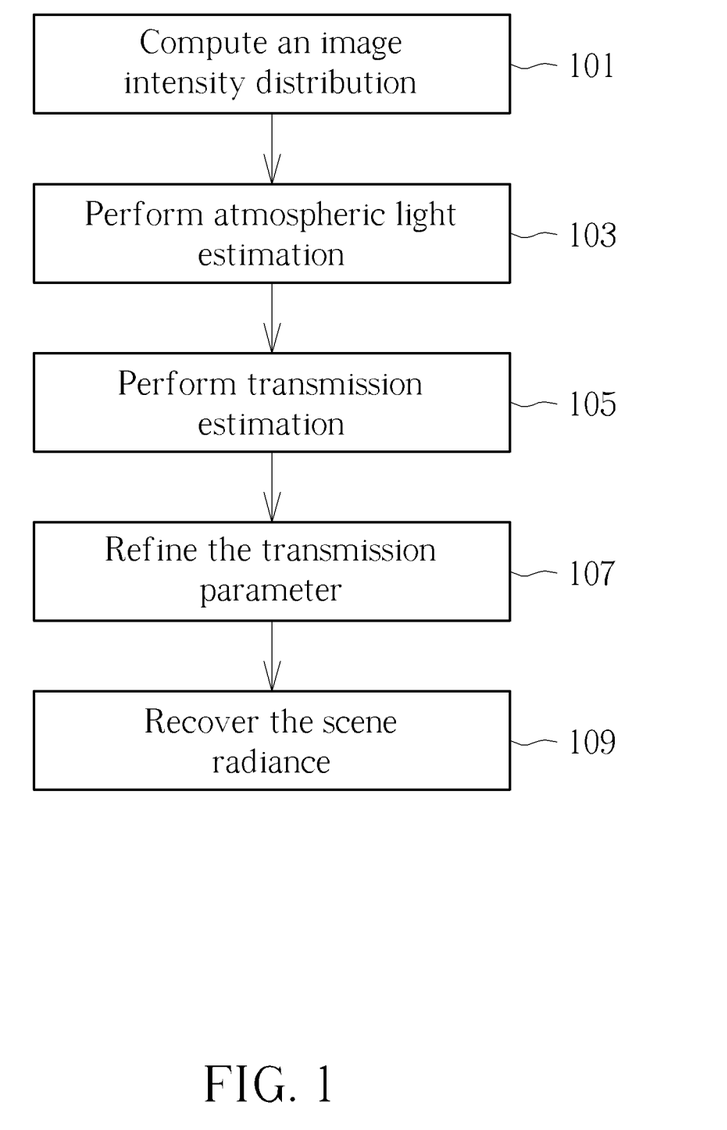
FIG. 1 is a flow chart illustrating an image processing method according to one embodiment of the present application.

FIG. 1 is a flow chart illustrating an image processing method according to one embodiment of the present application. As illustrated in FIG. 1, the image processing method comprises following steps:

Step 101:

Compute an image intensity distribution of an input image.

Step 103:

Perform atmospheric light estimation to the input image.

Step 105

Perform transmission estimation according to a result of the step 101 to the input image, to generate a transmission parameter.

Step 107

Refine the transmission parameter.

Step 109

Recover the scene radiance of the input image according to the results of the steps 103 and 105.

In one embodiment, at least one of the steps 101-107 is performed to data corresponding to only partial pixels of the input image. Besides, in one embodiment, the image processing method is applied for de-hazing the input image, but not limited. Details for each step will be described in following descriptions. In one embodiment, one of the steps 101-107 is performed to data corresponding to only partial pixels of the input image, and other steps of the steps 101-107 are performed to data corresponding to all pixels of the input image.

Figure 2A:
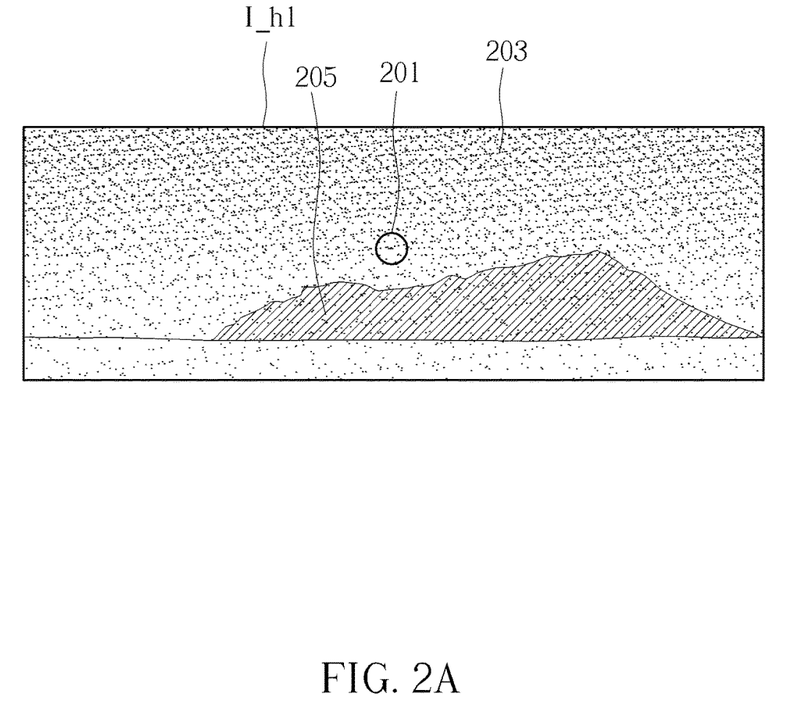
FIG. 2A, FIG. 2B, FIG. 3A, FIG. 3B, FIG. 4A and FIG. 4B are schematic diagrams illustrating operations of the image processing method illustrated in FIG. 1.

Several examples are provided to explain each step illustrated in FIG. 1. Please note the following examples do not mean to limit the scope of the present application. Other method can be applied to implement the steps illustrated in FIG. 1. Also, an input image I_h1 with haze is provided for explaining in FIG. 2A, and an input image I_h2 without haze is provided for explaining in FIG. 2B. The dots in FIG. 2A represent the concentration of haze. That is, the more dots on the image, the higher concentration the haze is. For example, a concentration for an upper part of the input image I_h1 is higher than a lower part of the input image I_h1.

In an input image comprises haze, the input image may be expressed as following Equation (1)

$$I(x)=J(x)t(x)+A(1-t(x)) \qquad \text{Equation (1)}$$

I(x) is the observed image intensity (i.e. the intensity of the input image I_h), J(x) is the scene radiance (i.e. a clear input image without haze), A(1−t(x)) is the atmospheric light and t(x) is the transmission parameter. The transmission parameter t(x) may be a value between 0 and 1 and describes the portion of light that reaches the camera. Therefore, the goal of haze removal is to recover A(x), J(x) and t(x) from I(x).

If an image part of the input image is clean and comprises no haze, such image part certainly has at least one pixel with a low image intensity, such as shadow, colorful objects/surfaces, or dark objects/surfaces. For example, the input image I_h2 in FIG. 2B comprises no haze and comprises the land image 209, and, thus, the pixel P_1 has a low image intensity. It will be appreciated that a pixel with a low image intensity means a dark pixel. On the opposite, if an image part of the input image comprises haze, all pixels in such image part may have high image intensities. For example, all pixels in the input image I_h1 illustrated in FIG. 2A have high image intensities. Therefore, the image density distribution can indicate the concentration for the haze of the input image.

In one embodiment, the image intensity distribution is computed based on Dark Channel Prior, which may be expressed as following Equation (2):

$$J^{dark}(x) = \min_{c \in \{r,g,b\}} \left( \min_{y \in \Omega(x)} (J^C(y)) \right) \qquad \text{Equation (2)}$$

$J^C$ is a color channel (i.e. a pixel) of an input image J and $\Omega(x)$ is a processing window centered at x. $J^{dark}$, which is called a dark channel of the input image J, is a darkest pixel in a window. For example, the dark channel $J^{dark}$ is a darkest pixel for a window $\Omega(x)$, which is centered at the pixel x. Therefore, the dark channel $J^{dark}$ is always low if the input image J has no haze. On the contrary, the dark channel $J^{dark}$ is always high if the input image J has haze.

Figure 2B:
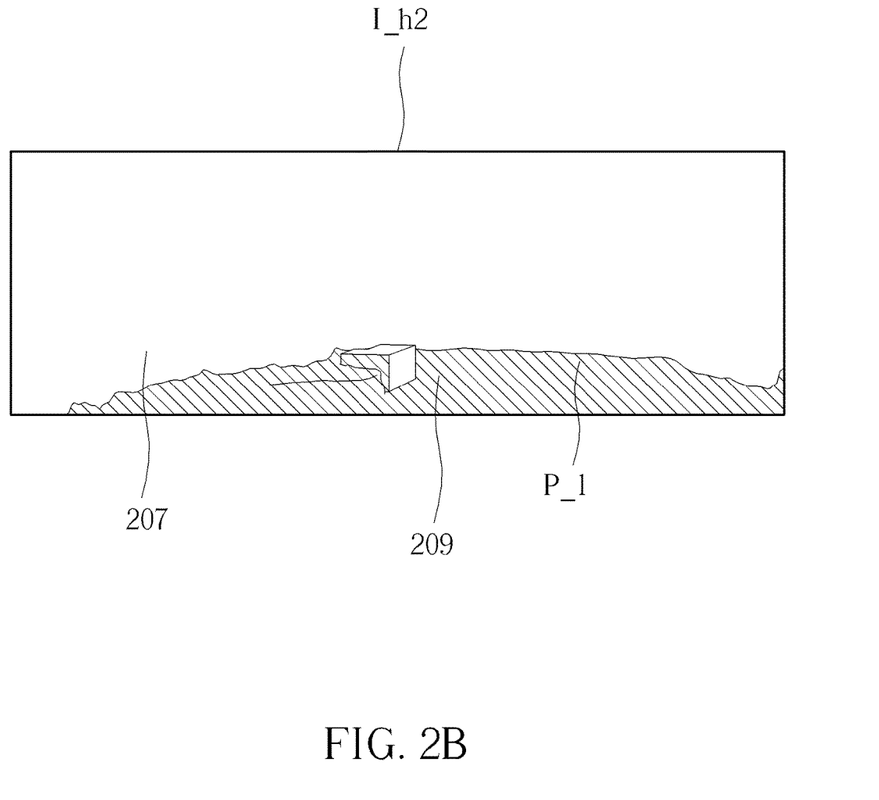
Figure 3A:
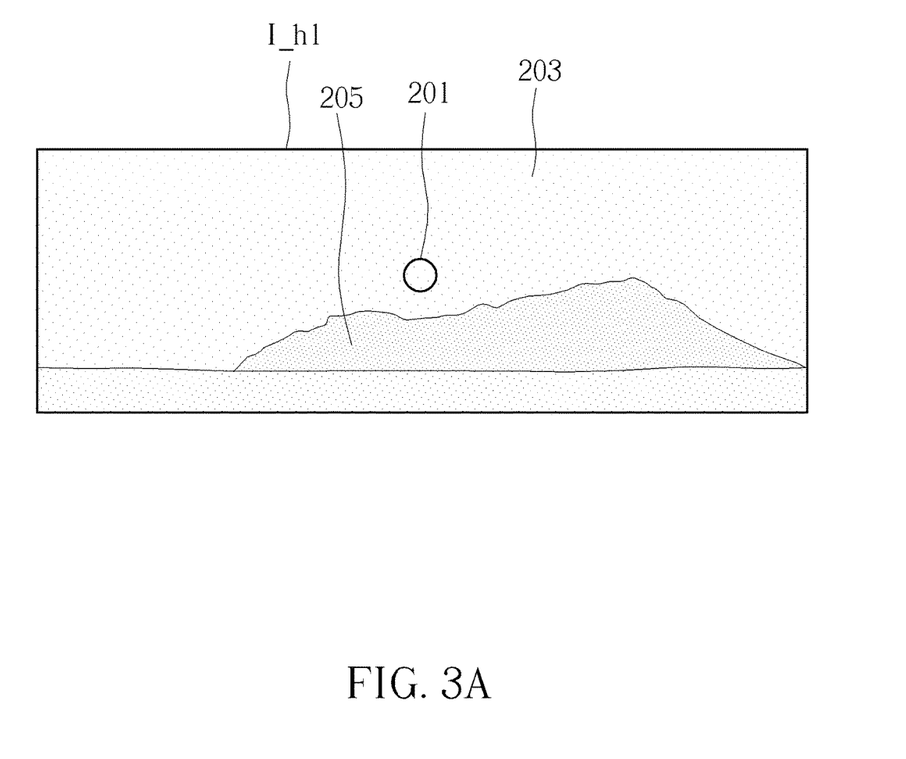
Figure 3B:
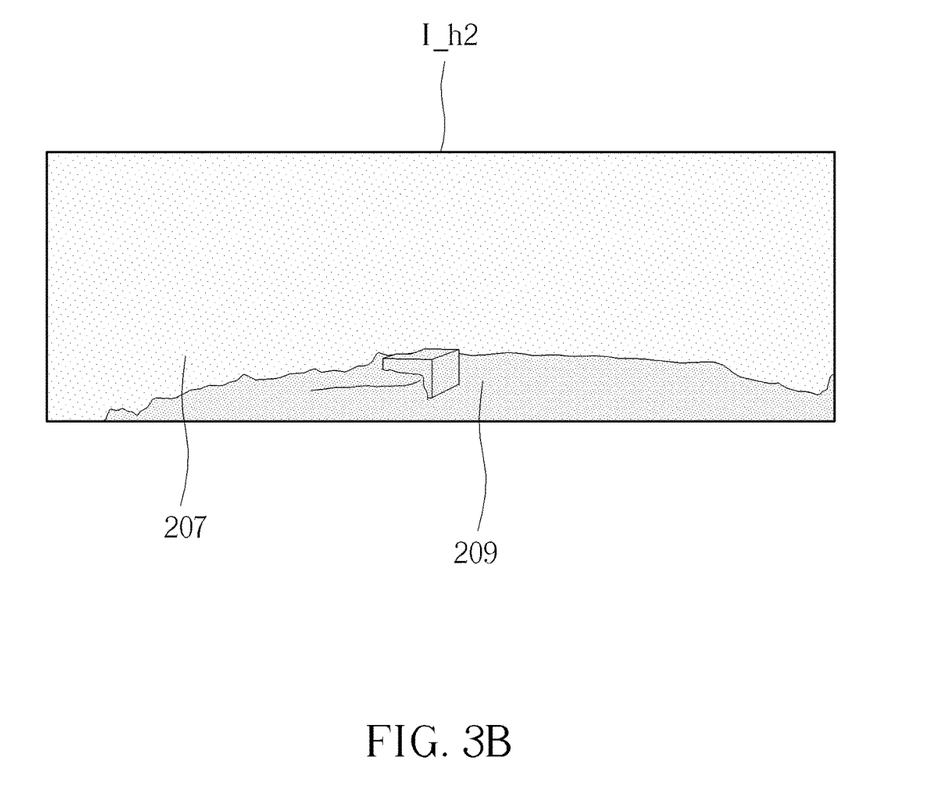

FIG. 3A and FIG. 3B are schematic diagrams illustrating the dark channel prior generated according to the input image I_h1 in FIG. 2A and the input image I_h2 in FIG. 2B.

As illustrated in FIG. 3B, the dark channel for the land image 209 is low since no haze is distributed on the land image 209. On the opposite, the image intensity of the dark channel for the mountain image 205 in FIG. 3A is still low but higher than which of the land image 209, since some haze is distributed on the mountain image 205. Following the same rule, the sun image 201 and the sky image 203 in FIG. 3A both have dark channels with higher image intensity since much haze are distributed thereon.

After acquiring the image intensity distribution, the step 103 in FIG. 1 can be performed to estimate atmospheric light. In one embodiment, top N % brightest pixels are selected. Such pixels are always in a haze region of the input image. N can be any predetermined value. In one embodiment, N may be set to "0.1". After that, among the N % pixels, the pixel with a highest intensity in the input image is selected as the estimated atmospheric light.

After the atmospheric light estimation is completed, the step 105 in FIG. 1 can be performed to estimate the above mentioned transmission parameter t(x). In one embodiment, the transmission estimation is performed based on above-mentioned dark channel prior, and such operation is stated in detail as below.

If above-mentioned Equation (1) is normalized by the atmospheric light, the following Equation (3) can be acquired:

$$\frac{I(x)}{A^C} = \frac{J(x)}{A^C} t(x) + (1 - t(x)) \qquad \text{Equation (3)}$$

Since the transmission estimation is respectively performed to each R, G, B pixel, the symbol A meaning the estimated atmospheric light for the whole image is changed to $A^C$, which means the estimated atmospheric light for one of the R, G, B pixels. Then, if the transmission estimation is performed in a manner of minimum operation (minimum processing window and minimum component), the following Equation (4) can be acquired based on the Equation (3):

$$\min_{\Omega}\left(\min_{C}\left(\frac{I^C(x)}{A^C}\right)\right) = \min_{\Omega}\left(\min_{C}\left(\frac{J^C(x)}{A^C}\right)\right) t(x) + (1 - t(x)) \qquad \text{Equation (4)}$$

As above-mentioned, the dark channel is almost zero if the input image has no haze. Accordingly, if the input image is assumed to have no haze, $$\min_{\Omega}\left(\min_{C}\left(\frac{J(x)}{A^C}\right)\right)$$

is zero. Accordingly, the transmission estimation can be expressed in following Equation (5).

$$t(x) = 1 - \min_{\Omega}\left(\min_{C}\left(\frac{I^C(x)}{A^C}\right)\right) \qquad \text{Equation (5)}$$

Based on Equation (1), the scene radiance J(x) can be expressed as following Equation (6):

$$J(x) = \frac{I(x) - A}{t(x)} + A \qquad \text{Equation (6)}$$

For more detail, Equation (1) states I(x)=J(x)t(x)+A(1−t(x)), thus the equation I(x)−A(1−t(x))=J(x)t(x) can be accordingly acquired. After that, the Equation (6) can be accordingly acquired based on the equation I(x)−A(1−t(x))=J(x)t(x), which means an equation for recovering the scene radiance.

In one embodiment, the transmission t(x) is restricted to a lower bound, which means a small certain amount of haze is preserved in very dense haze regions.

Figure 4A:
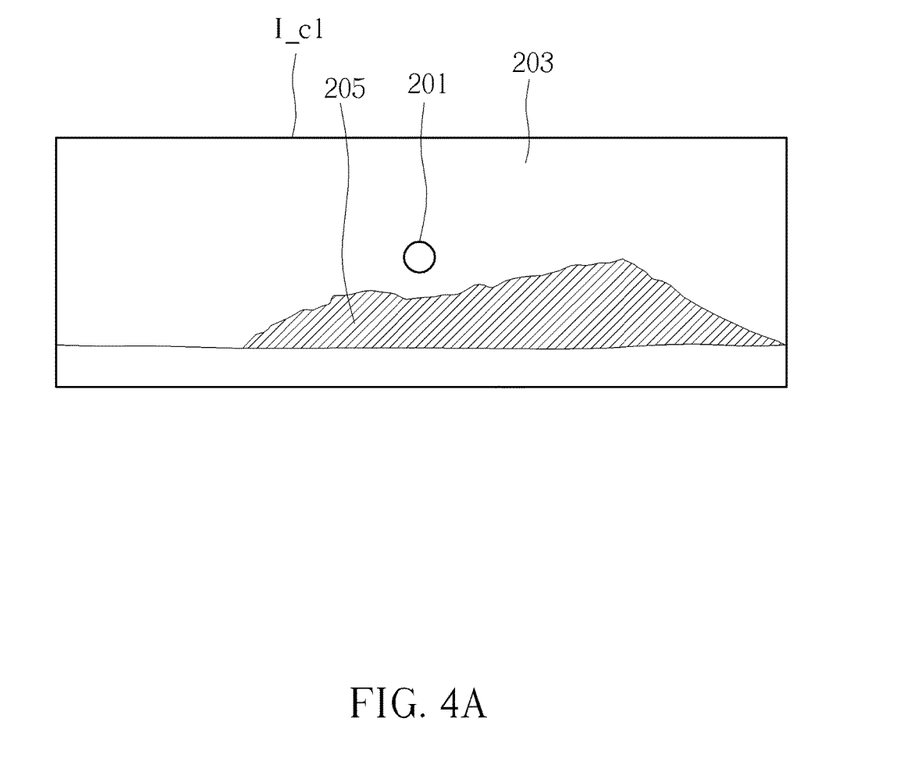
Figure 4B:
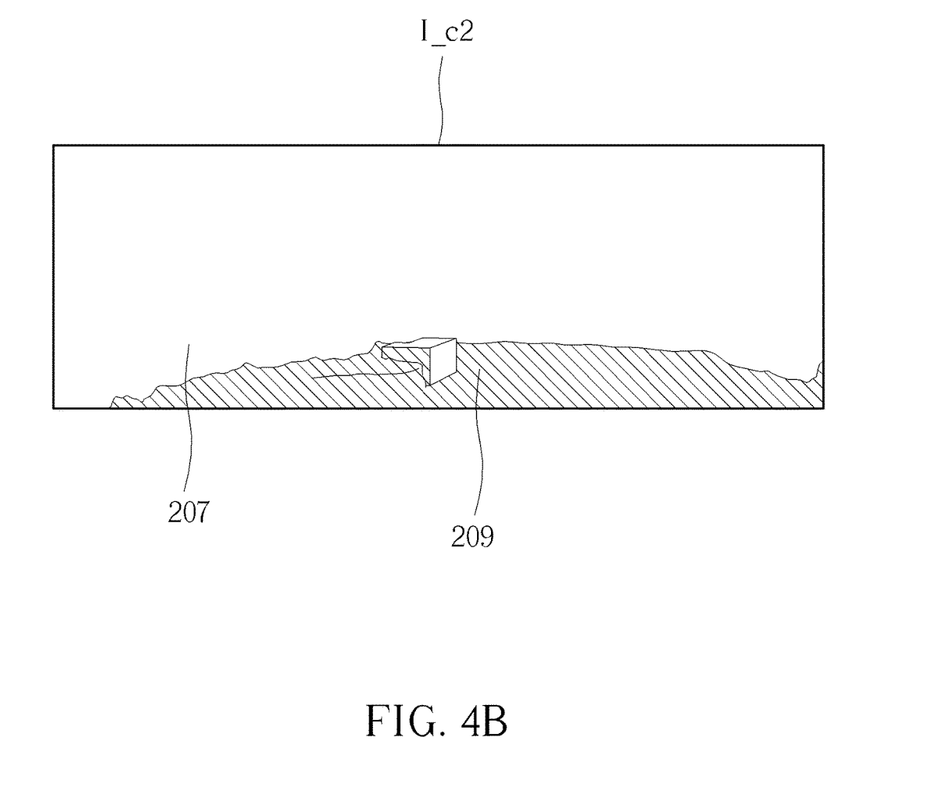

As above-mentioned, the steps illustrated in FIG. 1 can be applied but not limited to remove the haze of the input image. The result for the steps in FIG. 1 is illustrated in FIG. 4A, in which the haze is removed such that a clear input image I_c1 in FIG. 4A is acquired. Also, the input image I_h2 in FIG. B is processed by above-mentioned steps to remove haze, such that a clear input image I_c2 in FIG. 4B is acquired. However, the input image I_h2 in FIG. 1B originally has no have, thus contents for the input image I_h2 and contents for the clear input image I_c2 are the same.

In one embodiment, the transmission estimation parameter is further refined. Various methods can be applied to refine the transmission estimation parameter. In one example, the transmission estimation parameter is refined via image guided filtering.

Figure 5:
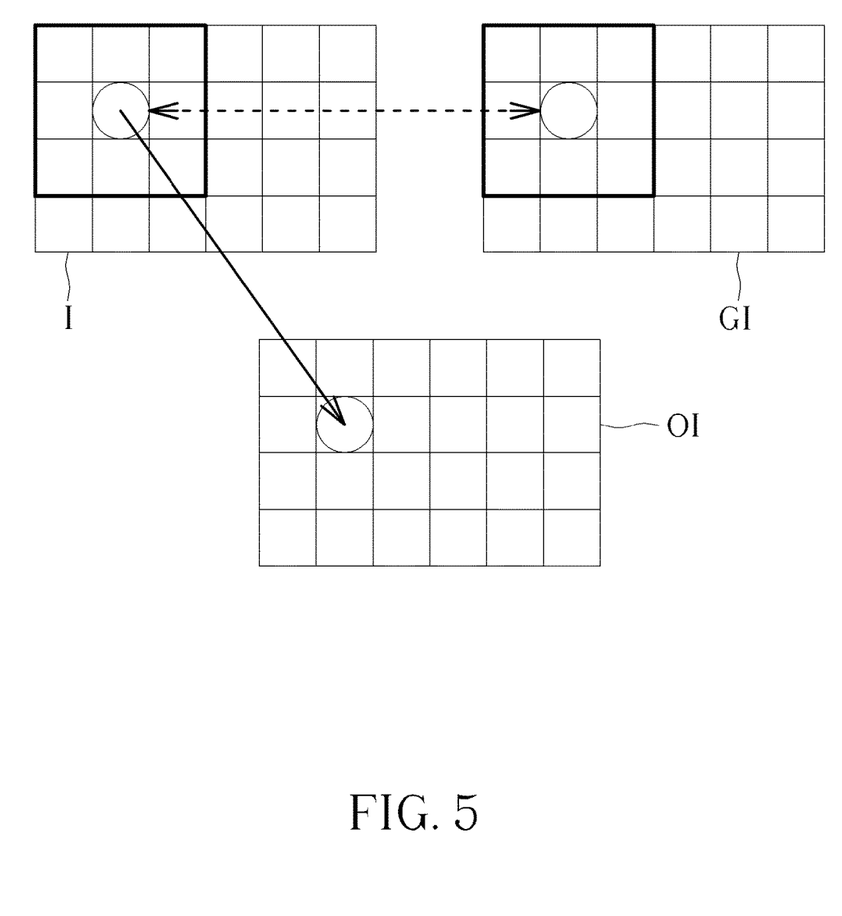
FIG. 5 is a schematic diagram illustrating applying image guided filtering for refining the transmission estimation parameter.

FIG. 5 is a schematic diagram illustrating applying image guided filtering for refining the transmission estimation parameter. As illustrated in FIG. 5, the image guided filtering performs edge-preserving smoothing on an input image I, using the content of a guidance image GI, to influence the filtering. The guidance image GI can be the input image I itself, a different version of the input image I, or a completely different image. The image guided image filtering is a neighborhood operation, like other filtering operations, but takes into account the statistics of a region in the corresponding spatial neighborhood in the guidance image GI when calculating a value of an output pixel in the output image OI. Other detail equations are omitted for variety here. Also, in another example, refining for the transmission estimation parameter can be implemented via soft matting.

In one embodiment, the input image is classified to various types of image region according to brightness information of the input image. Also, the steps 101-105 are performed to different types of image regions for different levels. Take FIG. 2 for example, the input image with hazard I_h can be classified to a sky region corresponding to the sky image 203, a mountain region 205 corresponding to the mountain image 205, a lake region corresponding to the lake image 207, and a land region corresponding to the land image 209. Afterward, the steps 101-105 are performed to different types of image regions for different levels. The term "level" here can indicate different parameters or different times. Many methods can be applied to classify the image to different image regions. In one embodiment, the image can be classified based on brightness information such as an average brightness, a maximum brightness, or a minimum brightness, but not limited. In one embodiment, an image segmentation method applying gradient map and region growing is applied to classify image regions.

Such method can be summarized as: classifying the input image to at least one first type of image region and at least one second type of image region according to brightness information of the input image; performing the at least one of the steps 101-105 for a first level to the first type of image region; and performing the at least one of the steps 101-105 for a second level to the second type of image region.

In one embodiment, at least one of the steps 101-107 is applied to data corresponding to only partial pixels of the input image. The pixels to which the steps 101-107 are performed can be selected randomly or selected following a predetermined rule, for example, down-sampling.

In one embodiment, only one of the steps 101-107 is applied to data corresponding to only partial pixels of the input image. In such embodiment, a corresponding up-sampling step can be performed after the step applied to data corresponding to only partial pixels of the input image. For example, if the step 101 is applied to only partial pixels of the input image, the up-sampling step can performed after any one of the steps 101-107.

In another embodiment, more than one of the steps 101-107 is applied to data corresponding to only partial pixels of the input image. The steps which are performed to data corresponding to only partial pixels of the input image can be continuous or non continuous. For example, the continuous steps 101, 103 are applied to data corresponding to only partial pixels of the input image. For another example, the non-continuous steps 103, 107 are applied to data corresponding to only partial pixels of the input image. In such embodiment, a corresponding up-sampling step can be performed after the steps applied to data corresponding to only partial pixels of the input image. For example, if the steps 101, 103 are applied to data corresponding to only partial pixels of the input image, the up-sampling step can performed after any one of the steps 103-107.

Figure 6:
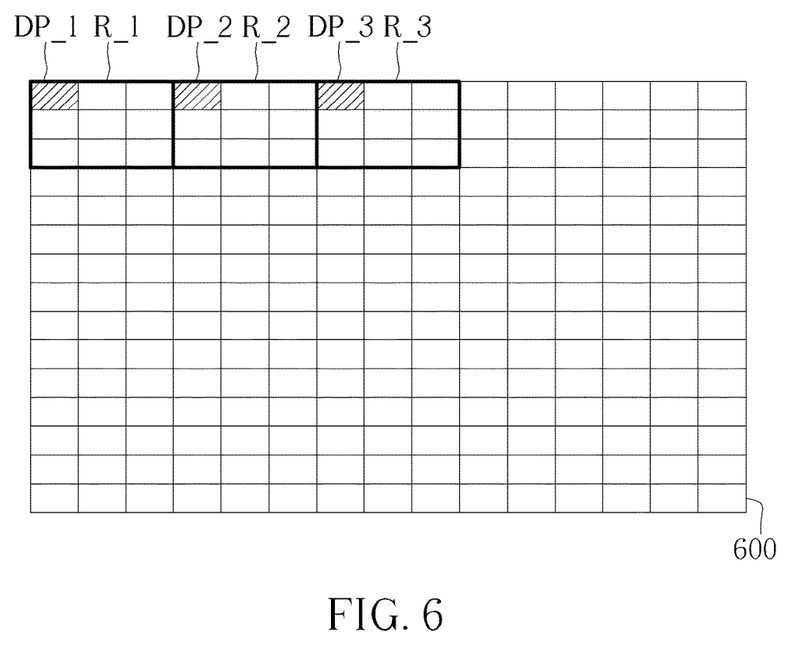
FIG. 6 and FIG. 7 are schematic diagrams illustrating an example for processing data corresponding to only partial pixels of the input image according to embodiments of the present application.

Various methods can be applied to perform the above-mentioned operation" processing data corresponding to only partial pixels of the input image. FIG. 6 is a schematic diagram illustrating an example for processing data corresponding to only partial pixels of the input image according to one embodiment of the present application. As illustrated in FIG. 6, the input image 600 is classified into a plurality of processing regions. However, only three of the processing regions R_1, R_2, and R_3 are shown and symbolized for example. At least one of the steps 101-107 in FIG. 1 is performed to target pixels DP_1, DP_2 and DP_3 respectively in the processing regions R_1, R_2 and R_3. The term "target pixel" means a pixel that at least one of the steps 101-107 in FIG. 1 is performed to. For example, in one embodiment, the step 101 is performed to only target pixels DP_1, DP_2 and DP_3 respectively in the processing regions R_1, R_2 and R_3, which means the image intensity distribution for the target pixels DP_1, DP_2 and DP_3 is progressively computed.

In one embodiment, a relation between a locations for each of the target pixels DP_1, DP_2, DP_3 and each of the corresponding processing regions R_1, R_2, R_3 keeps the same (i.e. is fixed), as illustrated in FIG. 6. For example, the first pixels in the processing regions R_1, R_2, R_3 are taken as the target pixels DP_1, DP_2, DP_3. For more detail, in the first step, at least one of the steps 101-107 is performed to the target pixel DP_1 in the processing region R_1. After that, at least one of the steps 101-107 is performed to the target pixel DP_2 in the processing region R_2. Then, at least one of the steps 101-107 is performed to the target pixel DP_3 in the processing region R_3. Therefore, the method illustrated in FIG. 6 can reduce data computation amount since not all of steps 101-107 are performed to all pixels.

In one embodiment, data corresponding to the target pixels DP_1, DP_2 and DP_3 is simultaneously processed rather than progressively processed. For example, in one embodiment, the step 101 is performed to only target pixels DP_1, DP_2 and DP_3 in the processing regions R_1, R_2 and R_3. The addresses for data of the target pixels DP_1, DP_2 and DP_3 are firstly acquired. After that, the image intensity distribution for the target pixels DP_1, DP_2 and DP_3 are simultaneously computed according the acquired.

Figure 7:
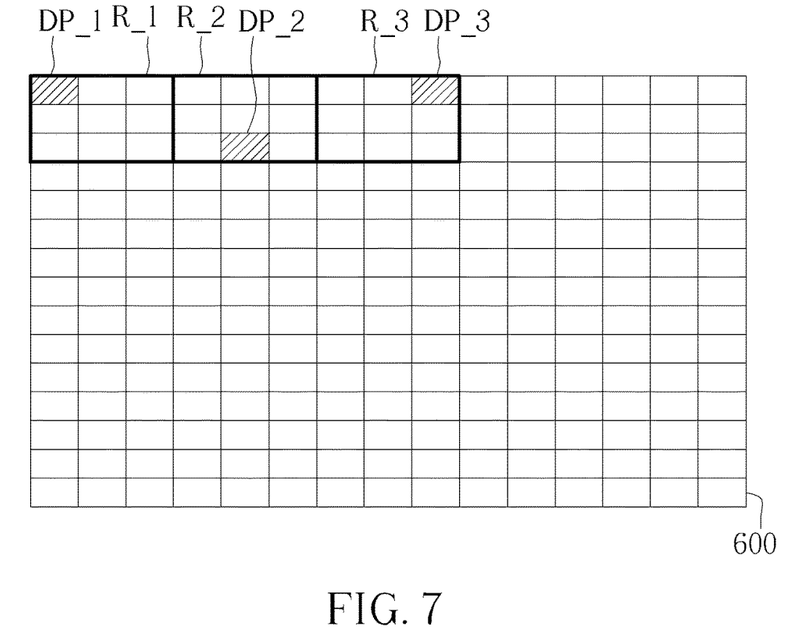

However, the relations between a location for each of the target pixels DP_1, DP_2, DP_3 and the corresponding processing regions R_1, R_2 and R_3 can be different, which is randomly selected, as illustrated in FIG. 7.

Figure 8:
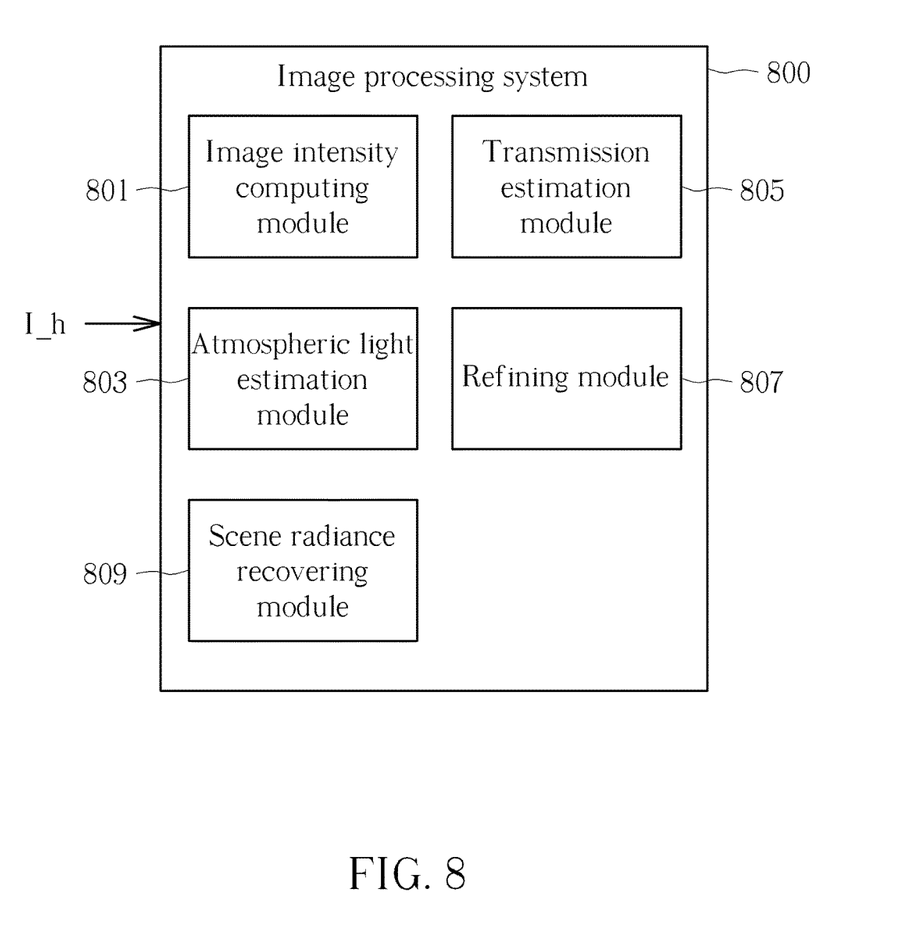
FIG. 8 is a block diagram illustrating an image processing system according to one embodiment of the present application.

FIG. 8 is a block diagram illustrating an image processing system according to one embodiment of the present application. As illustrated in FIG. 8, the image processing system 800 comprises: an image intensity computing module 801 for performing the step 101 in FIG. 1, an atmospheric light estimation module 803 for performing the step 103 in FIG. 1, a transmission estimation module 805 for performing the step 105 in FIG. 1, a refining module 807 for performing the step 107 in FIG. 1 and a scene radiance recovering module 809 for performing the step 109 in FIG. 1. In one embodiment, the refining module 807 is removed. Besides, in another embodiment, the image processing system 800 further comprises a classifying module (not illustrated here) for classifying the input image to at least one first type of image region. Other details for the image processing system 800 can be acquired based above-mentioned embodiments, thus are omitted for brevity here.

At least one of the image intensity computing module 801, the atmospheric light estimation module 803, the transmission estimation module 805 and the refining module 807 performs corresponding operations to data corresponding to only partial pixels of the input image. The "corresponding operations" indicate the module performs an operation thereof. For example, the corresponding operation for the image intensity computing module is "computing the image intensity distribution".

As above-mentioned description, the modules illustrated in FIG. 8 can be implemented by hardware (ex: a circuit), or hardware with software (ex: a processor with a program). Also, the modules illustrated in FIG. 8 can be combined to fewer modules or separated into more modules.

In view of above-mentioned embodiments, the haze in the image can be removed based on fewer data computation amount. Also, the image can be classified into different regions, such that the steps for removing haze can be more effective.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, applied to an image processing system, comprising:
   (a) computing an image intensity distribution of an input image;
   (b) performing atmospheric light estimation to the input image;
   (c) performing transmission estimation according to a result of the step (a) to the input image, to generate a transmission estimation parameter; and
   (d) recovering scene radiance of the input image according to a result generated by the step (b) and the transmission estimation parameter;
   wherein at least one of the steps (a)-(c) are performed to data corresponding to only partial pixels of the input image;
   wherein the image processing method further comprises:
   classifying the input image to at least one first type of image region and at least one second type of image region according to brightness information of the input image;
   performing the at least one of the steps (a)-(c) for a first level to the first type of image region; and
   performing the at least one of the steps (a)-(c) for a second level to the second type of image region.

2. The image processing method of claim 1, wherein the input image is classified into a plurality of processing regions;
   wherein at least one of the steps (a)-(c) is performed to at least one target pixel respectively in each of the processing regions.

3. The image processing method of claim 2, wherein a relation between a location for each of the target pixels and a corresponding processing region is fixed.

4. The image processing method of claim 2, wherein a relation between a location for each of the target pixels and a corresponding processing region is random.

5. The image processing method of claim 1, wherein the step (a) computes the image intensity distribution via computing dark channel prior for the input image.

6. The image processing method of claim 1, wherein one of the step (a), the step (b) and the step (c) is performed to data corresponding to only partial pixels of the input image, and other steps for the step (a), the step (b) and the step (c) are performed to all pixels of the input image.

7. The image processing method of claim 1, wherein at least two of the steps (a), (b), (c) are performed to data corresponding to the only partial pixels of the input image.

8. The image processing method of claim 7, wherein the at least two of the steps (a), (b), (c) which are performed to data corresponding to the only partial pixels of the input image are continuous.

9. The image processing method of claim 7, wherein the at least two of the steps (a), (b), (c) which are performed to data corresponding to the only partial pixels of the input image are non-continuous between one another.

10. The image processing method of claim 1, further comprising:
    (d) refining the transmission estimation parameter, wherein the step (d) is performed to data corresponding to only partial pixels of the input image.

11. An image processing system, comprising:
    an image intensity computing circuit, configured to compute an image intensity distribution of an input image;
    an atmospheric light estimation circuit, configured to perform atmospheric light estimation to the input image;
    a transmission estimation circuit, configured to perform transmission estimation according to a result of the image intensity computing circuit to the input image, to generate a transmission estimation parameter; and
    a scene radiance recovering circuit, configured to recover scene radiance of the input image according to a result generated by the step atmospheric light estimation circuit and the transmission estimation parameter;
    wherein at least one of the image intensity computing circuit, the atmospheric light estimation circuit and the transmission estimation circuit performs corresponding operations to data corresponding to only partial pixels of the input image;
    wherein the image processing system further comprises a classifying circuit for classifying the input image to at least one first type of image region and at least one second type of image region according to brightness information of the input image;
    wherein at least one of the image intensity computing circuit, the atmospheric light estimation circuit and the transmission estimation circuit performs corresponding operations for a first level to the first type of image region; and
    wherein at least one of the image intensity computing circuit, the atmospheric light estimation circuit and the transmission estimation circuit performs corresponding operations for a second level to the second type of image region.

12. The image processing system of claim 11, wherein the input image is classified into a plurality of processing regions; wherein at least one of the image intensity computing circuit, the atmospheric light estimation circuit and the transmission estimation circuit performs corresponding operations to at least one target pixel respectively in each of the processing regions.

13. The image processing system of claim 12, wherein a relation between a location for each of the target pixels and a corresponding processing region is fixed.

14. The image processing system of claim 12, wherein a relation between a location for each of the target pixels and a corresponding processing region is random.

15. The image processing system of claim 11, wherein the step image intensity computing circuit computes the image intensity distribution via computing dark channel prior for the input image.

16. The image processing system of claim 11, wherein one of the image intensity computing circuit, the atmospheric light estimation circuit and the transmission estimation circuit performs corresponding operations to data corresponding to only partial pixels of the input image, and other ones for the image intensity computing circuit, the atmospheric light estimation circuit and the transmission estimation circuit are performed to all pixels of the input image.

17. The image processing system of claim 11, wherein at least two of the image intensity computing circuit, the atmospheric light estimation circuit and the transmission estimation circuit perform corresponding operations to data corresponding to the only partial pixels of the input image.

18. The image processing system of claim 17, wherein the at least two of the image intensity computing circuit, the atmospheric light estimation circuit and the transmission estimation circuit, which perform corresponding operations to data corresponding to the only partial pixels of the input image, continuously perform corresponding operations to data corresponding to the only partial pixels of the input image.

19. The image processing system of claim 17, wherein the at least two of the image intensity computing circuit, the atmospheric light estimation circuit and the transmission estimation circuit, which perform corresponding operations to the only partial pixels of the input image, non-continuously perform corresponding operations to data corresponding to the only partial pixels of the input image.

20. The image processing system of claim 11, further comprising a refining circuit for refining the transmission estimation parameter, wherein the refining circuit only performs corresponding operations to data corresponding to only partial pixels of the input image.

* * * * *